United States Patent [19]

Wood, III

[11] Patent Number: 4,554,842
[45] Date of Patent: Nov. 26, 1985

[54] ANTI-BACKLASH MECHANISM FOR MACHINE DRIVE

[75] Inventor: David B. Wood, III, West Chester, Ohio

[73] Assignee: Cincinnati Milacron Inc., Cincinnati, Ohio

[21] Appl. No.: 487,962

[22] Filed: Apr. 25, 1983

[51] Int. Cl.[4] ............... F16H 55/18; F16H 57/00
[52] U.S. Cl. ................................. 74/409; 74/410; 74/411; 74/440
[58] Field of Search ............... 74/409, 440, 410, 411, 74/445

[56] References Cited

U.S. PATENT DOCUMENTS

| | | | |
|---|---|---|---|
| 2,081,644 | 5/1937 | Smythe | 74/440 |
| 2,533,043 | 12/1950 | Price | 74/409 |
| 2,655,050 | 10/1953 | Divette et al. | 74/409 |
| 2,847,102 | 8/1958 | Tiedeman et al. | 74/409 |
| 2,902,875 | 9/1959 | Finally et al. | 74/409 |
| 2,946,232 | 7/1960 | Jones | 74/392 |
| 3,020,775 | 2/1962 | Musser | 74/409 |
| 3,151,494 | 10/1964 | Sedgwick | 74/409 |
| 3,405,580 | 10/1968 | Hallden | 74/409 |
| 4,422,344 | 12/1983 | Wutherich | 74/440 |

Primary Examiner—Lawrence Staab
Assistant Examiner—Michael David Bednarek
Attorney, Agent, or Firm—Thomas M. Farrell

[57] ABSTRACT

An anti-backlash mechanism for a machine drive is disclosed, wherein a shaft carries a rotary worm wheel having drive connections to the tangs of two back-to-back clutch units. The first clutch unit is connected to a rotatable shaft, concentric with the worm wheel, and having a first helical gear on its end. A second helical gear on the support shaft is torsionally and axially free to slip. The second gear is connected to the second clutch unit by a torque tube permitting relative axial movement to occur between the two. A first actuator biases the two gears apart, and a second actuator between the second helical gear and the clutch units provides clamping force to engage the mechanism. An output bull gear is in mesh with the pair of helical gears. To engage the mechanism, the second actuator is energized, impressing a snugging force on the discs of the clutch units, and driving the second helical gear in an axial direction toward the first helical gear. Continued movement in an axial direction causes the clearance to be taken up between the teeth of the helical gears and the tooth space of the bull gear and will cause the gears to roll with respect to one another, thus taking the shake out of the spline teeth and drive tang connections between the clutch units and the worm wheel. When the second helical gear "bottoms", pressure build-up in the second actuator will cause maximum clamping force to be realized by the clutch units thereby preloading all parts for maximum drive stiffness.

5 Claims, 5 Drawing Figures

ANTI-BACKLASH MECHANISM FOR MACHINE DRIVE

BACKGROUND OF THE INVENTION

This invention relates to anti-backlash gearing systems constructed to take the shake and backlash out of mating gears in a power drive. Even though mating gears are constructed with the same tooth form, there will generally be clearance around a gear tooth in a mating gear tooth space, due to manufacturing tolerances and certain alignment inaccuracies. In machines of the metal chip removing type wherein heavy gear loads are seen, certain inertial effects may cause a driven gear to move around the driving gear tooth, thus creating a banging and hammering of gears. Further, on machines requiring a drive reversal, backlash clearance must be taken up first by driving gear movement, thus resulting in lost motion of the follower gear.

Many inventions in the prior art have addressed themselves to the problem of removing backlash from mating gears, and one popular system involves taking either the driven or driving gear and splitting it into two separate thinner gears which are countertorqued against one another to take up the tooth clearance. One common infirmity of these types of designs which will be discussed hereafter is that the countertorque forces are generally fixed, and may create undesirable tooth loads when the drive system is not engaged in a power cut. For example, in a rapid traverse movement, a high rate of pitch line velocity is seen, and it is often desirable to have a lessened countertorque force at that time.

Several prior art systems are contained in the following U.S. patents:

U.S. Pat. No. 2,081,644, Smythe, "Antirattling Gear", discloses a split gear system having the two gear segments on a common shaft counter rotated by hydraulic pressure ported to the inner surfaces of the gear bodies to remove backlash. One problem inherent with this drive system is that the gears are counterotated by what is in effect a hydraulic spring which may cause vibrational problems, and also presents a constant torque loading on the gear teeth.

U.S. Pat. No. 2,533,043, Price, "Backlash Eliminating Mechanism", discloses a spur gear drive train which is connected to a worm and worm wheel driven assembly through a pair of crossed helical gears. The pair of crossed helical gears are mounted on respective crossed shafts, and backlash is taken out of the system by driving the one shaft in a axial direction with a piston. The axial movement causes the helical gear teeth to act as a cam or wedge, thereby winding up the driving gear train, and loading all the backlash areas in one direction. The system has to be reversed when driving in the opposite direction, i.e., the actuating piston must be shifted in an opposite direction to again load all the backlash areas of the driving gear train in an opposite countertorque direction.

U.S. Pat. No. 2,655,050, Divette et al, "Antibacklash Gearing", discloses a machine drive wherein a pair of helical gears, relatively rotatable with respect to one another and located on a common shaft, are countertorqued by thrusting both gears in the same axial direction, reactively against a mating pair of helical gears which are relatively fixed with respect to one another. The opposite or counterrotation of the thrusted gears, causes respective drive gears connected to the rotatable helical gears, to be counterrotated against a driven member. Attention is drawn particularly to FIG. 3, and to col. 3, lines 54–64, "assuming motor 62 is not operating, it will be noted that the axial thrust on shaft 50 tends to rotate gears 49 and 48 in a direction to drive rack 46 and table 45 *backwards* whereas the same thrust tends to cause gears 52 and 47 to drive the rack and table in a *forward* direction. As a result, gears 47 and 48 pinch the rack teeth from opposite sides and provide a firm driving relation without backlash regardless of the direction of operation of motor 62." (Emphasis supplied). The thrust element in this system is a biasing spring. The spring tends to put a constant countertorque load on the driving gear teeth which remains in effect throughout all speeds of rotation.

U.S. Pat. No. 2,902,875, Finally et al, "Means for Reciprocating Elements of Machine Tools and the Like", discloses two complete and separate drive trains and motors connected to a driven element such as a machine rack. The driven gears are countertorqued against one another by their respective drive motors, one drive motor being the primary motor and the other motor being merely a drag load to take the shake out of the system. This system has a large number of gears in the drive trains, and the expense of plural drive motors.

U.S. Pat. No. 2,946,232, Jones, "Gear Drive", discloses two parallel drive trains connected to a common driving shaft and a single prime mover, wherein the shaft is split, allowing back-to-back shaft gears to be "phase-adjusted" by means of a ring gear which rotates a pair of planet pinions in mesh with a differential set of shaft gears. This type of assembly utilizes only one drive motor, but involves large numbers of gears in the system, and the ring gear provides a fixed adjustment which must be manually set.

U.S. Pat. No. 3,020,775, Musser, "Antibacklash Devices", discloses an apparatus for countertorquing a pair of coaxial gears, wherein one gear has a shaft extending through the other, hollow gear. The hollow gear has an internal helical gear at its opposite end, which receives an axially movable helical gear. The gears are, in effect, a "spiral spline". The helical gear has an internal spline which provides a direct torque couple to the shaft within the hollow gear. Axial adjustment of the helical gear by means of an axial adjusting screw causes a camming or rotation of the helical gears and shafts, thus countertorqueing the shaft mounted gear with the hollow gear. The adjustment is manually accomplished, and is preset until additional backlash is adjusted out of the system. The internal helical gear is a relatively expensive member to machine, and to closely mate with the external helical gear.

U.S. Pat. No. 3,151,494, Sedgwick, "Backlash Eliminator" discloses a machine table drive, wherein a pair of independent shaft mounted pinions are in mesh with a common bull gear and are countertorqued to take backlash out of the system. Countertorquing of the two gears is accomplished by training a timing belt around timing pulleys mounted to the shafts, and by impressing a midspan load on the belt by a transverse roller, which imparts a countertorque to the two pinions. The elastic belt used in this system results in a drive which is not stiff enough for many applications, and the drive tends to be more useful for unidirectional movement, that is where the power train is brought to one pinion driving against a "leading" flank. Reversing the direction of the drive causes the shaft which is connected to the drive to be relatively ineffective in back driving the bull gear, since the pinion is now biased to the trailing flank. The actual back drive would occur by virtue of the timing belt drive to the opposite shaft, which is a relatively weak drive system for that direction.

Applicant has obviated the difficulties inherent in these prior art devices by a novel anti-backlash drive system which is selectively supplied and adjustable as to preload. Further, the drive is able to be locked in a preload condition for continuous drive movement.

SUMMARY OF THE INVENTION

The invention is shown embodied in a machine drive utilizing a machine base and a drive mechanism carried by the base. A rotary support shaft is carried by the base having a torque input member such as a worm wheel rotated thereon in driving connection with the drive mechanism. First and second clutch units are tang-driven by the worm wheel. A pair of helical gears are carried coaxially on the shaft, the first gear fixed with respect to the shaft and the second gear torsionally and axially free to slip with respect to the shaft. Spline teeth key the first gear to the first clutch unit, and a torque tube keys the second gear to the second clutch unit. A first piston-and-cylinder actuator spreads the helical gears, and a second piston-and-cylinder actuator is interposed between the second helical gear and the clutch units. The actuators are oil-powered and an output bull gear is rotatably carried by the base in mesh with the first and second gears. In operation, the first actuator is constantly pressurized to spread the gears and, when it is desired to clamp the clutch units, pressure is brought into the second actuator, snugging the clutch units and axially moving the second helical gear in reaction, overcoming the first actuator. The axial movement of the second gear with respect to the first gear, first causes the clearance to be taken up between the respective gear teeth and the mating tooth space on the bull gear, and continued movement in an axial direction will cause the gears to roll with respect to one another, thus taking the shake and clearance out of all spline teeth and clutch tangs. When an axial stop is encountered, pressure build-up in the second piston and cylinder set will cause final, maximum, clamp force to be applied to the clutch units. The stiff drive can then transfer power from the worm wheel to the bull gear.

DESCRIPTION OF THE PREFERRED EMBODIMENT

Figure 1:
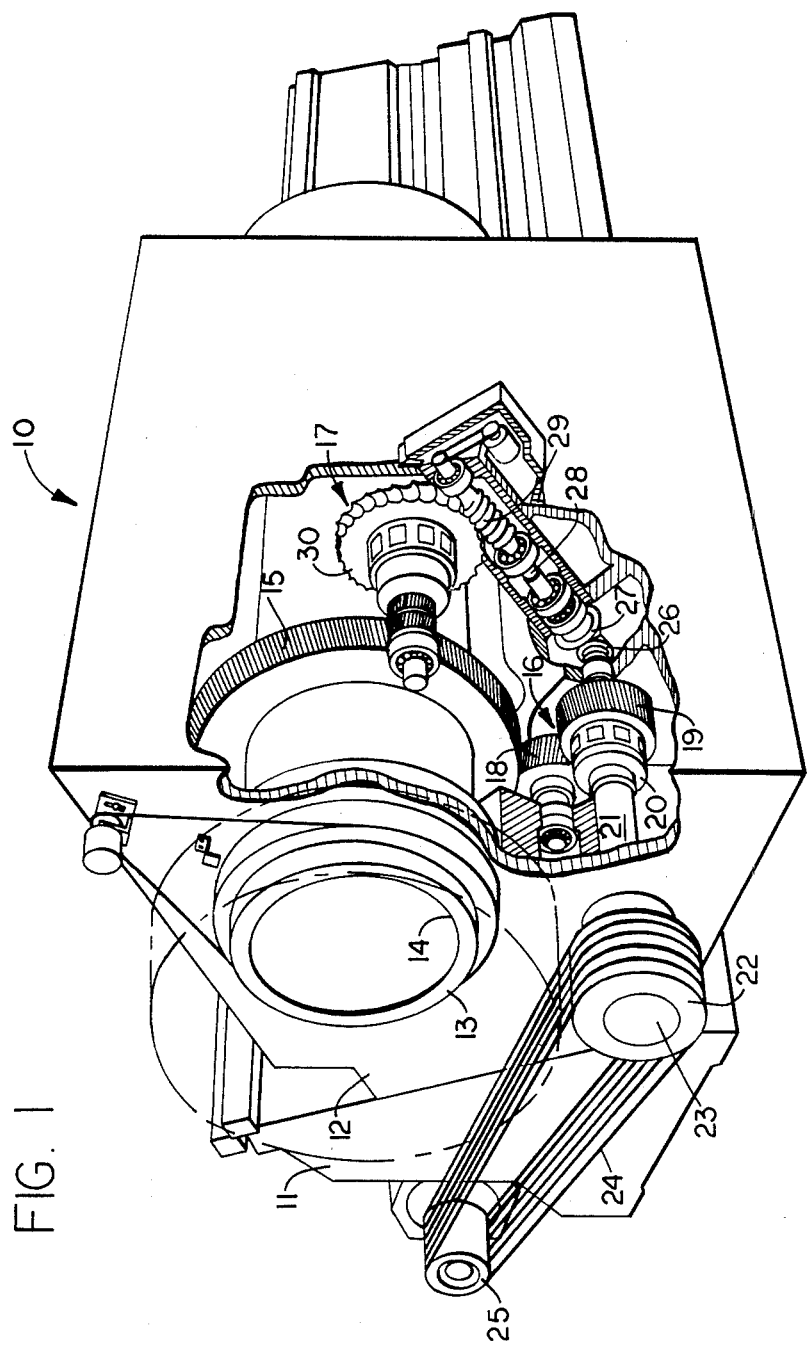
FIG. 1 is an isometric view of a machine headstock employing an antibacklash mechanism for a machine drive.

FIG. 1 of the drawings depicts an isometric view of the left front corner of a turning machine 10 having an inclined base 11, known in the trade as a "slant bed" machine, and a headstock 12 is affixed to the base 11. The headstock 12 supports a rotatable spindle 13, having a large hole 14 throughout its length, for receiving long workpieces, such as tubes, to be machined at their extremeties. It is desirable on machines of this type to provide high spindle speeds for turning a workpiece with a single point turning tool, while yet having the capability of rotating at extremely slow rpm for the workpiece for performing a milling operation on the workpiece at the front of the headstock spindle 13 by a special milling head (not shown) attached to the slant bed of the machine.

A main drive helical bull gear 15, is affixed to the machine spindle 13, and the bull gear 15 is in mesh with a turning drive 16 and a milling drive 17. The headstock 12 forms a base for the drives 16,17. The turning drive 16 consists of an idler gear 18 meshing with a gear 19 coupled to a clutch unit 20 mounted to an input drive shaft 21 journalled in the headstock 12. The drive shaft 21 has a driven sheave 22 on its outboard end 23 and a belt drive 24 connection is provided from the drive motor sheave 25 to the driven sheave 22. For turning at high rates of speed the turning drive clutch unit 20 is energized, and the drive connection is made to the bull gear 15. A bevel gear 26 is attached to the innermost end of the input drive shaft 21 in mesh with a second bevel gear 27 attached to an angularly oriented rotatable worm shaft 28. The worm shaft 28 has a slightly tapered thread diameter, or worm 29, along its length, in mesh with a worm wheel 30 rotatably carried by the milling drive 17. The worm 29 is slid axially a slight amount to adjust backlash out of the fixed-center-distance worm 29 and worm wheel 30 engagement. The worm wheel 30 serves as an input member receiving power for the milling drive 17.

Figure 2:
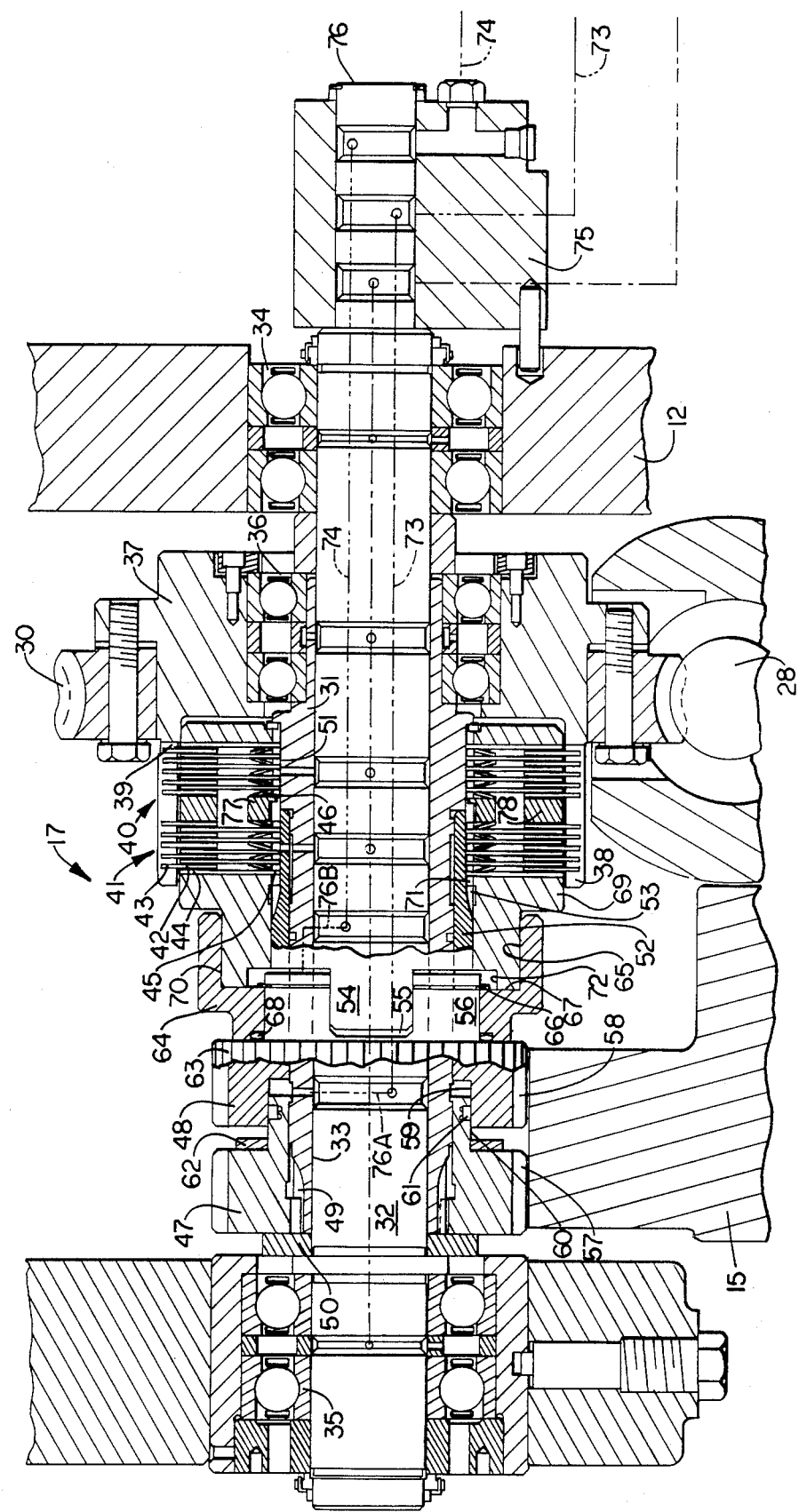
FIG. 2 is a section through the antibacklash mechanism of FIG. 1.

Referring to FIG. 2, the milling drive 17 is shown mounted to the headstock 12. The drive 17 has a central support shaft 31 rotatably carried by an inner shaft 32 which extends through a bore 33 in the support shaft 31 and is mounted in bearing sets 34,35 at the opposite ends. It may be appreciated by those skilled in the art that the support shaft 31 and inner shaft 32 could be manufactured as an integral piece but, for preferred interdrilling; machining operations; and assembly techniques, the two piece support shaft assembly utilized. The worm wheel 30 functions as a torque input member, and is rotatably carried on a bearing set 36 on the support shaft 31. The worm wheel 30, of course, is drivingly connected to the worm shaft 28, or drive mechanism. The worm wheel 30 is free to overrun the support shaft 31 when the two 31,30 are not driven in unison. The worm wheel 30 has a bolted hub portion 37 which has an extension 38 from one face having a plurality of slots 39. First and second clutch units 40,41 are received within the extension 38. The clutch units 40,41 are of the friction disc type, wherein common outer rings 42 have external radially-extending tangs 43 which are received in the slots 39 of the extension 38, and alternately spaced inner rings 44 have internal radially-extending tangs 45 for torque transmission. The inner and outer rings 44,42 are normally positioned with respect to one another by biasing springs 46 received between the alternate rings 44, until such time as an axial compression force is applied, thereby causing the frictional interfaces of the rings 42,44 to grab and run together. This type of clutch has an advantage in that, at predetermined torque levels, the clutch rings 42,44 will slip with one another, preventing overload and breakage of machine components. First and second helical gears 47,48 are coaxially carried on the support shaft 31. The first gear 47 is torsionally and axially fixed with respect to the shaft 31 by spline teeth 49 and a shoulder ring 50 on the inner shaft 32, but it may be appreciated that the first gear 47 and shaft 31 could, if desired, be manufactured as an integral unit. The second helical gear 48 is torsionally and axially free to slip on the support shaft 31. The support shaft 31 has a plurality of spline teeth 51, which engage the inner rings 44 of the first clutch unit 40 so that the rings 44 and shaft 31 drive in unison, and a torque couple is thereby established between the inner rings 44 and the first helical gear 47. A torque tube 52 is received on the support shaft 31, between the second gear 48 and the second clutch unit 41, and the torque tube 52 has spline teeth 53 which engage the inner rings 44 of the second clutch unit 41. The opposite end of the torque tube has a pair of straight tangs 54 which are received in mating tang slots 55 in the hub extension 56 of the second helical gear 48 to provide a torque couple between the second clutch unit 41 and the second helical gear 48. It may be appreciated by those skilled in the art, that the torque tube 52 and second helical gear 48 could be manufactured as a single integral unit, but the gear 48 must be free to slide axially with respect to the support shaft 31, since it is somewhat difficult to slide the spline teeth 53 through the inner rings 44 while under torque loading, the smooth flat sides of the tangs 54 permit the relative sliding to occur with ease under torque loading.

The helical gears 47,48 have oppositely disposed faces 57,58 and the second helical gear 48 has a first cylinder bore 59 machined to a prescribed depth while the face 57 of the first helical gear 47 has a hub projection which extends as a piston 60 into the cylinder bore 59. A piston ring 61 is provided around the piston 60 to maintain a fluid seal. The piston 60 and cylinder bore 59 therefore function as a first linear actuator between the first and second helical gears 47,48. A stop ring 62 is received on the piston 60 to limit movement of the second gear 48. The opposite side face 63 of the second helical gear 48 has a hub extension 56 upon which is received a close-fitting cylinder housing 64 having a second cylinder bore 65 extending to a prescribed depth (opening towards the clutch units 40,44). The cylinder housing 64 is retained on the hub extension 56 by a snap ring 66 received on the extension 56 and bearing against the bottom 67 of the cylinder bore 65. An O-ring 68 is provided in the cylinder housing 64, to provide a fluid seal around the hub extension 56. A pressure disc 69 has a close-fitting hub extending as a piston 70 into the cylinder bore 65. The disc 69 is slidably received on the torque tube 52 and provided with spline teeth 71 received in the mating spline teeth 53 of the torque tube 52. A counterbore 72 is provided at the piston 70 of the pressure disc 69 to clear the hub extension 56 of the second helical gear 48. The cylinder housing 64 and pressure disc 69 thereby form a second linear actuator interposed between the second helical gear 48 and the clutch units 40,41. Hydraulic pressure is brought through two hydraulic lines 73,74 extending through the inner shaft 32 from a stationary slip ring manifold 75 on the outboard end 76 of the inner shaft 32. Radial ports 76(a)(b) are drilled through the support shaft 31 and inner shaft 32 to connect the hydraulic lines 73,74 to the respective cylinder bores 59,65. The bull gear 15 of the headstock spindle 13 is in mesh with the first and second helical gears 47,48 functioning as an output gear for the milling drive 17. Inner and outer spacers 77,78 position the clutch units 40,41.

OPERATION

Figure 3:
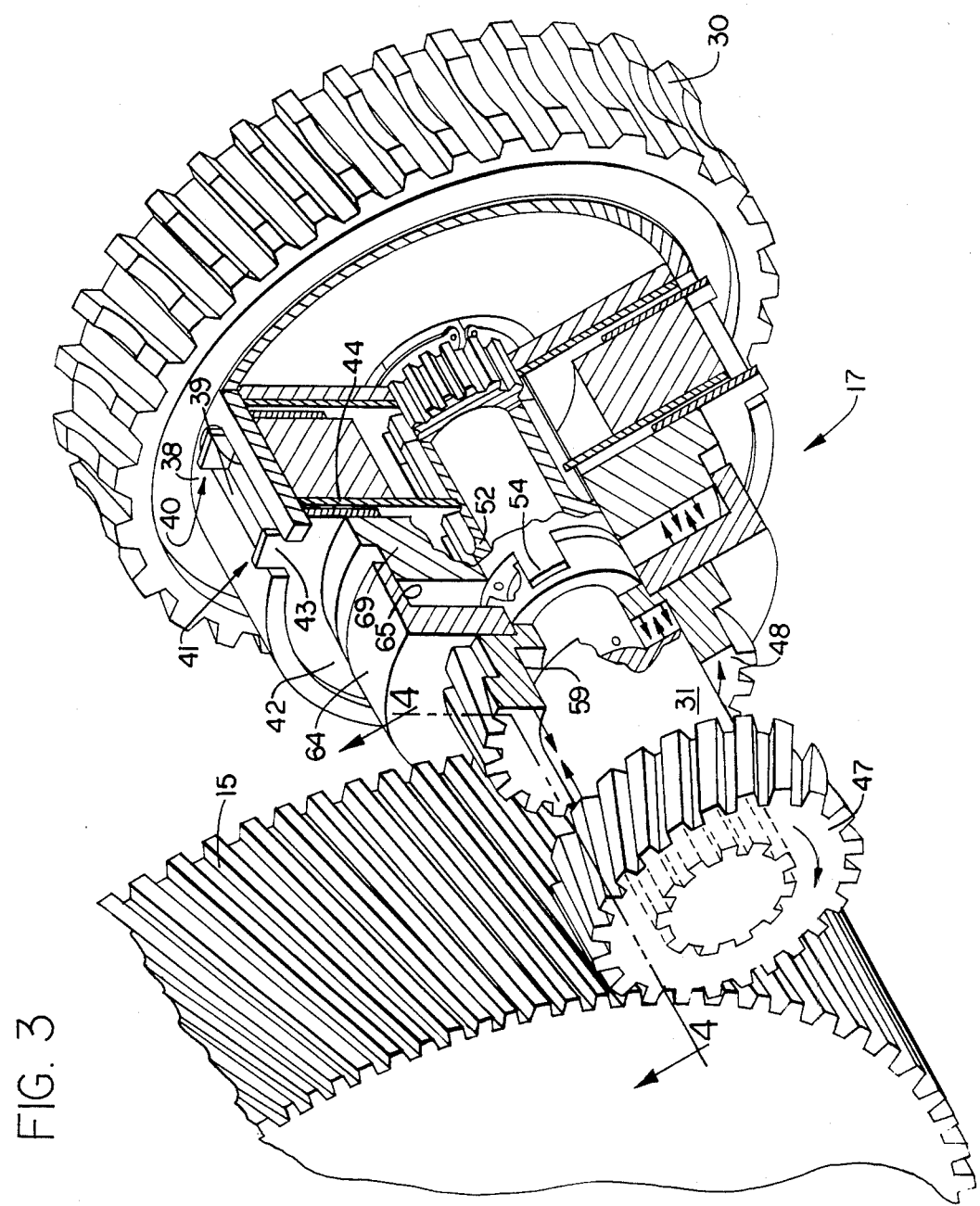
FIG. 3 is an isometric view in diagrammatic form of the elements of FIG. 2.
Figure 4A:
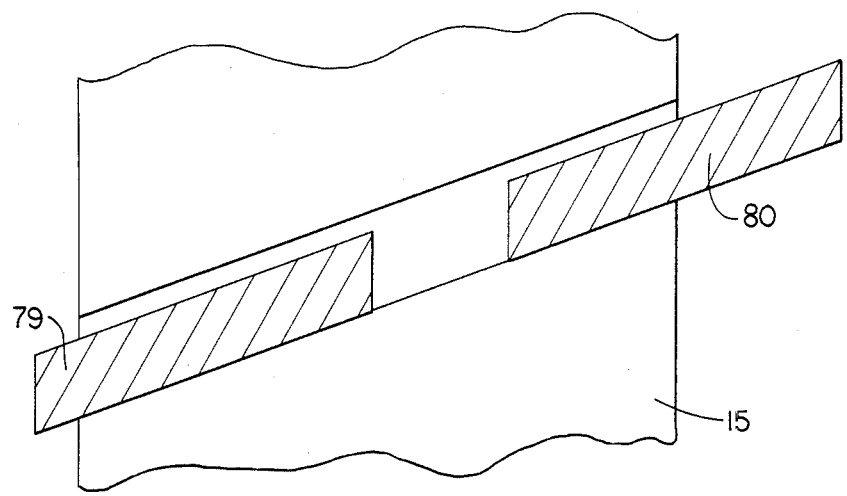
FIGS. 4a and 4b are alternate positions of the gear teeth taken along the line 4—4 of FIG. 3.
Figure 4B:
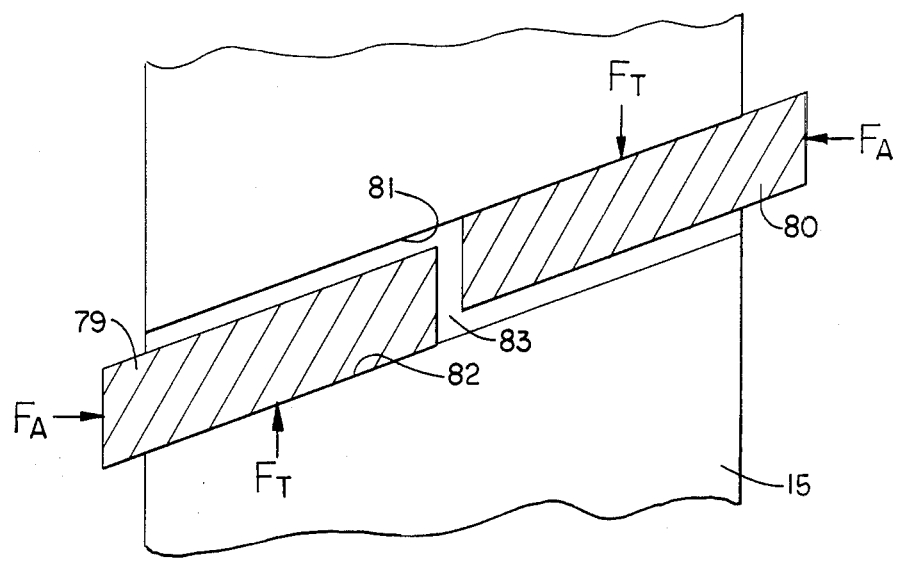

The isometric view of FIG. 3 depicts the elements of FIG. 2 in diagrammatic form, in partial broken-away section. The inner and outer rings 44,42 of the first and second clutch units 40,41 have been simplified as to form and number, to illustrate the principle involved. At all times of operation, pressurized oil is brought into the cylinder bore 59 of the second helical gear 48, thus forcing that away from the first helical gear 47, and creating a relationship between the teeth 79,80 of the two gears 47,48 and the bull gear 15 as shown in FIG. 4a. The second cylinder bore 65 is unpressurized at this time. If the bull gear 15 is driven by the turning drive 16 (see FIG. 1), the helical gears 47,48 will rapidly rotate with respect to the slowly rotating worm wheel 30 because the inner and outer rings 44,42 of the clutch units 40,41 will slip freely.

When it is desired to energize the milling drive 17, the turning drive clutch unit 20 (see FIG. 1) is deenergized and pressurized fluid is brought into the large area of the second cylinder bore 65. At this time, the pressure disc 69 will be forced against the clutch units 40,41 increasing the drag between the rings 44,42 but it may be appreciated that the full load is not realized, since the cylinder housing 64 and second helical gear 48 will react and tend to move away from the clutch units 40,41 overcoming the pressure in the first cylinder bore 59. As this axial movement continues, the gear teeth 79,80 of the helical gears 47,48 will be forced against opposite flanks 81,82 of the tooth space 83 in the bull gear 15 by the axial force FA, thus causing a tangential component FT, to be impressed on the helical gears 47,48 at their respective pitch lines. The resultant torque will cause a relative rotation to occur between the two gears 47,48 and, consequently, between the support shaft 31 and the torque tube 52, as well. This rotational movement between the shaft 31 and tube 52 causes movement of the respective inner and outer rings 44,42 through frictional drag, so that the tangs 43 of the outer rings 42 will be snugged against opposite sides of the slot 39 in the worm wheel extension 38. Once the second helical gear 48 "bottoms" with respect to the first helical gear 47 by contacting the stop ring 62 (see FIG. 2), and ceasing axial movement, the pressure build-up in the second cylinder bore 65 will cause the pressure disc 69 to exert the maximum clamping force on the clutch units 40,41. At this time, all "shake" or clearance has been taken out of the gear teeth 79,80; spline teeth 49,51,53; driving tang 54 of the torque tube 52; and the clutch tangs 43 of the outer rings 42, so that all torsional drive components are preloaded against each other for maximum drive stiffness. The initial slip torque of the clutches 40,41 establishes the preload. Later, as pressure in the second cylinder bore 65 is exhausted, the constant pressure in the first cylinder bore 59 will cause the second helical gear 48 to move to the right, thus reestablishing the clearances shown in FIG. 4a, and since the clutch clamping forces are relieved, the clutch rings 42,44 will be separated by the clutch springs 46 (see FIG. 2).

While particular multi-element friction disc clutch units 40,41 have been illustrated in conjunction with the preferred embodiment, alternate designs might employ other slip clutches such as cone clutches, simple friction facial clutches, etc., and/or combinations of clutch types, without affecting the principles of operation.

It may be appreciated that the anti-backlash mechanism may be applied to other units such as milling table drives, fixtures and the like.

While the invention has been shown in conjunction with a specific embodiment, it is not intended that the invention be limited to such embodiment, but rather, the invention extends to all such designs and modifications as come within the scope of the appended claims.

What is claimed is:

1. An anti-backlash mechanism for a machine drive, comprising:
   (a) a machine base;
   (b) a drive mechanism carried by said base;
   (c) a support shaft, rotatably carried by said base;
   (d) a torque input member rotatably carried by said shaft, in driving connection with said drive mechanism;
   (e) first and second clutch units, each coupled to said torque input member;
   (f) first and second helical gears carried coaxially on said shaft, said first gear torsionally and axially fixed with respect to said shaft, and said second gear torsionally and axially free to slip with respect to said shaft;
   (g) means for keying said first gear to said first clutch unit;
   (h) means for keying said second gear to said second clutch unit;
   (i) a first linear actuator interposed between and reacting against, said first and second gears;
   (j) a second linear actuator interposed between and reacting against, said second gear and said clutch units;
   (k) means for powering said first and second actuators; and
   (l) an output gear, rotatably carried by said base in mesh with said first and second gears.

2. The mechanism of claim 1, wherein said clutch units are of the friction-disc type.

3. The mechanism of claim 1, wherein said means for keying said first gear comprises in part, spline teeth, and said means for keying said second gear comprises, in part, a torque tube.

4. The mechanism of claim 1, wherein said first and second linear actuators are fluid-powered piston-and-cylinder sets.

5. An anti-backlash mechanism for a machine drive, comprising:
   (a) a machine base;
   (b) a driving gear, carried by said base;
   (c) a support shaft, rotatably carried by said base, and having a first helical gear at one end and a spline connector at the other end;
   (d) a driven gear, rotatably carried by said support shaft, drivingly connected to said driving gear;
   (e) first and second friction disc clutch units, serially spaced and coupled independently to said driven gear;
   (f) a second helical gear, carried coaxially on said support shaft, torsionally and axially free to slip with respect to said shaft;
   (g) a spline coupling said first clutch unit to said support shaft;
   (h) a torque tube drivingly connected to said second helical gear and said second clutch unit;
   (i) a first linear fluid actuator interposed between, and reacting against, said first and second gears;
   (j) a second linear fluid actuator interposed between, and reacting against, said second gear and said serially spaced clutch units;
   (k) a plurality of fluid lines for powering said fluid actuators; and
   (l) an output helical gear, rotatably carried by said base in mesh with said first and second helical gears.

* * * * *